INVENTORS
Michael J. Caparone,
Harold W. Rice and
BY Charles M. Vaughn.

THEIR ATTORNEY

April 26, 1955 M. J. CAPARONE ET AL 2,707,078
COMBINED THERMOSTAT AND AUTOMATIC PILOT CONTROL
Filed July 31, 1951 2 Sheets-Sheet 2

INVENTORS
Michael J. Caparone,
Harold W. Rice and
BY Charles M. Vaughn.
Albert J. Henderson
THEIR ATTORNEY

United States Patent Office 2,707,078
Patented Apr. 26, 1955

2,707,078

COMBINED THERMOSTAT AND AUTOMATIC PILOT CONTROL

Michael J. Caparone, Arcadia, Harold W. Rice, Los Angeles, and Charles M. Vaughn, Santa Monica, Calif., assignors to Robertshaw-Fulton Controls Company, Greensburg, Pa., a corporation of Delaware Application July 31, 1951, Serial No. 239,553

7 Claims. (Cl. 236—21)

This invention relates to combination controls for gaseous fuel burners wherein the temperature controlling device and the pilot cut-off both operate upon a single control valve.

The present invention is particularly adapted, although not limited, for use with gas burning water heaters and the like wherein water temperatures are to be controlled within precise limits. A single control valve biased to closed position is utilized for regulating temperatures and also as an automatic pilot cut-off for the main burner upon extinguishment of the pilot flame. The temperature adjusting dial and the main gas cock knob are both located on the front face of the control body for ready access by the user. Since provision may be made for complete shut-off of fuel to both the main and pilot burners under this automatic control, a separate pilot valve can be employed for conjoint operation to closed position with the main burner valve.

The temperature regulating means comprises a first thermal device operable on one side of the main control valve for opening the same to supply fuel to the main burner when required. In order to achieve safe lighting of the pilot burner, a novel lever means is movable into an active position on the opposite side of the main valve for holding it closed in opposition to the first device. However, a second thermal device is operable for moving the lever means out of its active position upon the pilot burner being ignited and heating this second thermal device to provide the automatic pilot feature.

In a preferred embodiment of the invention it is deemed unnecessary to interlock the main gas cock with the pilot valve to obtain safe lighting since the main valve cannot be opened unless the automatic pilot has previously been placed in operative condition. Thus, the usual "pilot" position on the main gas cock knob is dispensed with. This feature eliminates a source of trouble and annoyance due to failure in starting the appliance owing to misalignment of the knob indicia with the registry point by unskilled operators. Furthermore, this important object is achieved by simple and economical means embodying a minimum number of parts. A further object is to provide a fail-safe type of unit which will prevent leakage of fuel under abnormal conditions.

Other objects and advantages will become apparent from the following description taken in connection with the accompanying drawings wherein.

Main shut-off cock

Figure 1:
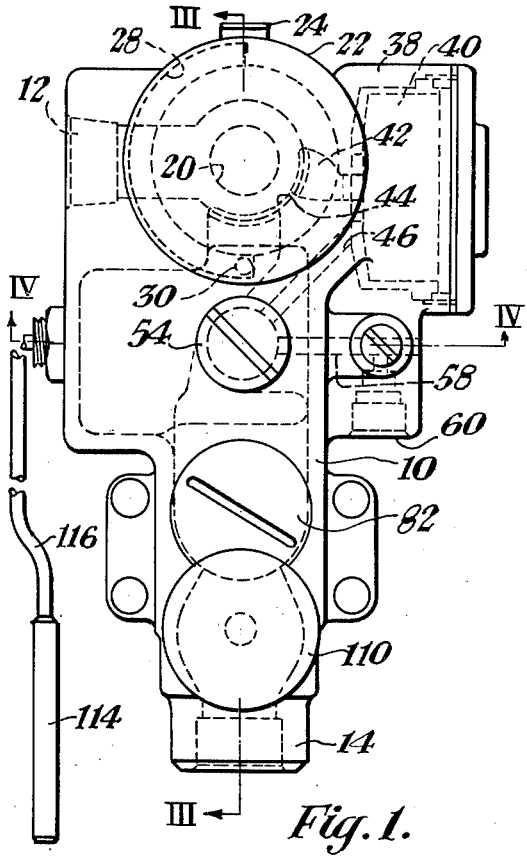
Fig. 1 is a front elevation of the control device.
Figure 2:
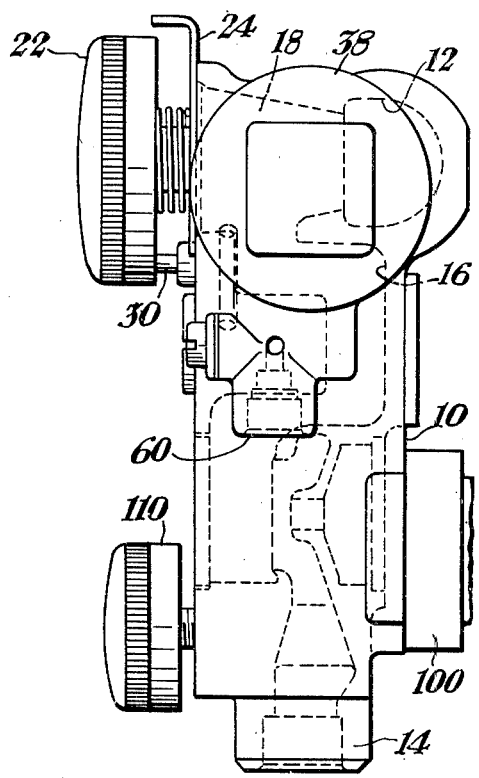
Fig. 2 is a side elevation of the control device shown in Fig. 1.

Referring more particularly to the drawings, the control device comprises a casing 10 provided at one end with a lateral inlet opening 12 and at the other end with an outlet opening 14 for the fuel. A main fuel passage 16 through the casing 10 provides communication between the inlet 12 and the outlet 14. As is customary in such devices, suitable pipe connections may be provided at the inlet 12 and the outlet 14 to convey fuel through the passage 16 to a main burner (not shown) of the appliance upon which the control is to be used.

The passage of fuel between the inlet 12 and the outlet 14 is under the control of a main shut-off cock 18 which projects exteriorly of the front face of the casing 10. The cock 18 is provided with an angular port 20 which is movable upon manual rotation of the cock 18 to open and close communication through the passage 16 between the inlet 12 and the outlet 14. A handle or knob 22 is secured to the projecting end of the cock 18 and carries the usual indicia for the open and closed positions, the latter being designated "off" as indicated as 23, the "on" position not appearing in the drawings. The two described positions of the main shut-off cock 18 are adapted to register selectively with a pointer 24 secured to the casing 10 in an appropriate location.

Suitable means may be employed for limiting the rotation of the cock 18 to approximately 180° between the full-open and full-closed positions. Thus, the knob 22 may be recessed on its underside defining an annular rim portion 26 containing an arcuate recess 28 extending between the "on" and "off" indicia 23. The opposite ends of the recess 28 alternately engage the sides of a plunger 30 which projects from the casing 10 into the recess 28 and serves as a limit stop for the purpose described.

The knob 22 is also adapted for limited axial movement relative to the cock 18 to engage the bottom of the recess 28 with the plunger 30 and move it axially in the casing 10. The plunger 30 extends into the fuel passage 16 and is biased by a coil spring 32 outwardly of the casing 10, but such movement is limited by the engagement of a collar 34 formed on the plunger 30 with the interior bottom wall of a cap nut 36 on the casing 10 and through which the plunger 30 projects.

Pilot valve

The casing 10 is provided with an integral hollow boss 38 disposed on one side of the shut-off cock 18 and provided with a filter cartridge 40 for the pilot fuel. The bottom wall of the filter cartridge 40 is suitably sealed in fluid tight connection with the bottom wall of the hollow boss 38 but the outer wall thereof is spaced from the inner wall of the boss 38 to provide a passage for fuel therebetween. To this end, a passage 42 is formed in the casing 10 for communication at one end with an arcuate groove 44 in the side wall of the shut-off cock 18 forming an extension of the port 20 therethrough. The groove 44 affords communication between the port 20 and the passage 42 when the shut-off cock 18 is rotated to the "on" position.

The opposite end of the passage 42 communicates with the hollow boss 38 adjacent the center of the filter cartridge 40 which thereby receives fuel to be filtered and emitted at one opposite end thereof. A pilot passage 46 communicates at one end with the space between the outer wall of the filter cartridge 40 and the inner wall of the hollow boss 38 and thereby forms an inlet passage to a pilot valve chamber 48 formed in the casing 10 to one side of the main fuel cock 18. A pilot valve member 50 is mounted in the chamber 48 and is reciprocable on an axis substantially parallel with that of the plunger 30 to open and close a passage through a valve seat member 52 which is supported in the chamber 48. A closure cap 54 provides access to the valve member 50 and also forms an abutment for one end of a coil spring 56 serving to bias the valve chamber 50 toward its seat 52.

An outlet passage 58 communicates with the passage in the valve seat member 52 and thus receive a supply of fuel from the inlet passage 46 when the valve member 50 is in open position. The opposite or outlet end of the passage 58 terminates in a suitable connection 60 for a pilot conduit for supplying fuel to a pilot burner (not shown). The usual adjusting means 62 is provided in the passage 58 for flow of fuel to the pilot burner.

Movement of the pilot valve member 50 between open and closed positions is effected by operation of a pilot valve stem 64 which projects through the passage in the pilot valve seat member 52 and is suitably fluted or non-circular to permit passage of fuel thereby. The usual sealing diaphragm 66 is provided for the operating end of the valve stem 64 to prevent leakage from the chamber 48. An operating head 68 is carried on the valve stem 64 on the opposite side of the sealing diaphragm 66 therefrom to provide convenient means for moving the valve member 50 to open position when desired. Such movement is accomplished by a pilot valve lever 70 which extends from the plunger 30 and has an operating or free end movable into operative engagement with the operating head 68. The free end of the lever 70 is suitably apertured to receive a guide pin extension 71 formed on the head 68. The lever 70 is pivoted intermediate its ends in a bracket 72 secured to an interior wall of the casing 10.

Control valve mechanism

As previously indicated, a single control valve is utilized for regulating temperatures and also as an automatic cut-off for the main burner fuel upon extinguishment of the flame at the pilot burner. Accordingly, an annular valve seat 73 is formed in the casing 10 in position to intersect the passage of fuel from the inlet 12 to the outlet 14 through the main fuel passage 16. An axial hollow boss 74 is formed within the annular valve seat 73 and provides a bearing for a valve stem 76 which is reciprocable therein. The valve stem 76 is axially bored to accommodate an override mechanism comprising a plunger 81 and an override spring 75. The plunger 81 is biased outwardly of the valve stem 76 by the spring 75 but such relative movement is limited by a stop in the form of a bushing 77 which engages a collar 79 formed on the plunger 81.

A disc valve member 78 is mounted on the valve stem 76 for axial reciprocable movement therewith between open and closed positions relative to the valve seat 73. The valve member 78 is normally biased toward the valve seat 73 by a coil spring 80 which is operative between a closure cap 82 carried by the casing 10 and the operating or free end 84 of an operating lever 86. A second coil spring 88 is operative between the free end 84 of the lever 86 and the valve member 78 to bias these members apart.

The operating lever 86 is suitably bent to angular form to extend through the fuel passage 16 and is pivoted at its opposite end on the bracket 72. The median portion of the lever 86 provides a second operating portion which is suitably apertured to receive the guide pin extension 71 and overlies the free end of the pilot valve lever 70. Means to be described hereinafter are employed for moving the intermediate or second operating portion of the operating lever 86 into active position relative to the pilot valve lever 70 and also for moving the free end or first operating portion 84 of this operating lever 86 into active position relative to the valve member 78. In the described active position, both the main valve member 78 and the pilot valve member 50 are held in open position to supply fuel to the main outlet 14 and the pilot outlet 60 respectively.

The axial hollow boss 74 forms one wall of a chamber 90 in the casing 10 which houses a snap-action means of conventional form comprising clicker mechanism 92 and an annular thrust element 94 for operating the valve member 78 to open position against the bias of the coil spring 88. The clicker mechanism 92 operatively engages the plunger 81 of the override mechanism which normally acts as a solid unit as hereinafter described. The thrust element 94 carries a thrust button 96 which projects through a sealing ring 98 forming an opposite wall for the chamber 90 and into a recess 99 formed in the casing 10.

Temperature regulation

Thermally responsive means for operating the valve member 78 through the clicker disc mechanism 92—96 is carried by a thermostat housing 100 which is secured to the exterior of the casing 10 across the recess 99. The housing 100 may be of conventional form for securing the control casing 10 to the tank of the water heater. The usual rod-and-tube element 102, 104 projects from the housing 100 into the tank of the water heater and, as is customary in such devices, the rod 102 has a relatively low coefficient of expansion while the tube 104 has a higher coefficient of expansion. The differential under the influence of the heat of the water in the tank causes the rod element 102 to move outwardly of the casing 10.

The rod element 102 projects into the recess 99 on one side of the thrust button 96 and engages a connecting lever 106 having an operating end supported on the thrust button 96. The opposite end of the lever 106 is engaged by an adjusting screw 108 which extends through the casing 10 on an axis substantially parallel with that of the valve member 78. An adjusting knob 110 is carried on the adjusting screw 108 for setting the temperature to be maintained by the rod-and-tube element 102, 104. Both the gas cock knob 22 and the temperature adjusting knob 110 are located on the front face of the casing 10 for convenient access by the user. Yieldable means in the form of a leaf spring 112 is carried by the thrust button 96 for operative engagement with the lever 106 to maintain it in engagement with the thrust button 96 and the adjusting screw 108 respectively.

Automatic pilot control

The vapor pressure type automatic pilot control of this invention is adapted to render the rod-and-tube element 102, 104 ineffective for overcoming the bias of the valve member 78 unless the pilot burner of the appliance is producing a flame. The automatic pilot control comprises an actuating device including a bulb element 114, a capillary tube 116 and a diaphragm unit 118 as is customary in such devices. The device is adjustably connected to the casing 10 by the provision of a threaded bushing 120 adjacent the diaphragm unit 118. The diaphragm unit 118 projects into a chamber 122 which communicates with the flow passage 16 adjacent the operating head 68 of the pilot valve member 50.

Figure 5:
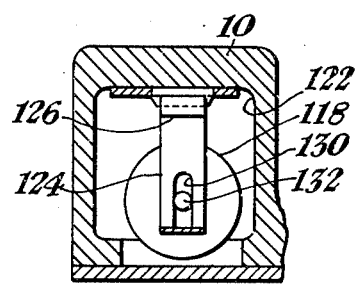
Fig. 5 is a partial section taken on the line V—V of Fig. 4.

The bulb element 114 contains a quantity of mercury which becomes vaporized upon the bulb element being sufficiently heated and serves to actuate the diaphragm unit 118 by expansion thereof, which movement occurs on an axis transverse to the main valve member 78 and the pilot valve member 50. Means are employed for transmitting the movement of the diaphragm unit 118 to the operating lever 86 at the intermediate or second operating portion thereof which is supported upon the guide pin extension 71 of the operating head 68 of the pilot valve member 50. To this end, an angular connecting lever 124 is pivotally supported at one end 126 on one wall of the chamber 122 and has a free end 128 overlying the intermediate or second operating portion of the operating lever 86 and suitably apertured for receiving the guide pin extension 71. The intermediate portion of the angular connecting lever 124 is provided with a slot 130 through which a stud 132 carried by the diaphragm unit 118 is adapted to project. As shown more clearly in Fig. 5, the stud and slot connection 132, 130 serve to position the lever 124 laterally of the chamber 122 and also to receive the thrust exerted by the diaphragm unit 118 upon expansion thereof.

Operation

The control device is placed in operative condition by manual operation when the knob 22 is rotated from "off" to "on" position and pushed in axially. The inward movement of the knob 22 serves to engage the bottom of the recess 28 therein with the plunger 30 which thereupon moves axially of the casing 10. The pilot valve lever 70 is thereupon rotated on the bracket 72 in a clockwise direction, as viewed in Fig. 3, which causes the pilot valve stem 64 to move to the left and open the pilot valve member 50.

Fuel now flows from the inlet 12, angular port 20 in the main shut-off clock 18, arcuate groove 44, passage 42, filter cartridge 40, hollow boss 38, passage 46, pilot valve seat 52, and through passage 58 to the connection 60 for the pilot burner. It should be observed that the pivoting of the pilot valve lever 70 on the bracket 72 is unaccompanied by any movement, pivotal or otherwise, of the operating lever 86. Consequently, no flow of fuel to the main outlet 14 can occur at this time since the main valve member 78 is biased to its seat 73 by the main valve spring 80.

Figure 4:
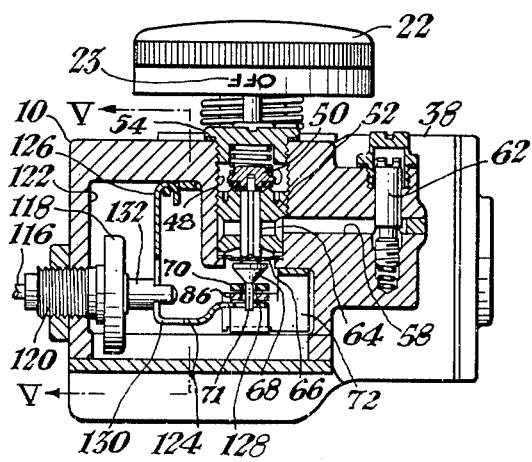
Fig. 4 is a cross-section taken on the line IV—IV of Fig. 1.

The fuel flowing from the pilot burner is now ignited manually while the knob 22 remains depressed. The pilot flame heats the bulb 114 which is located adjacent to the pilot burner and vaporizes the mercury contained in the bulb 114. The resulting movement of the diaphragm unit 118 causes the angular connecting lever 124 to pivot about the connected end 126 in a counterclockwise direction as viewed in Fig. 4. Since the free end of the lever 124 is in overlying relation with the intermediate portion of the operating lever 86, then a clockwise rotation of the operating lever 86, as viewed in Fig. 3, now occurs. The movement of the free end 84 or first operating portion of the lever 86 now overcomes the bias of the main valve spring 80 and the main valve member 78 is free to move to open position. At the same time, the movement of the intermediate or second operating portion of the operating lever 86 engages the pilot valve lever 70 which is positioned for holding the pilot valve member 50 in open position. Hence, as long as the diaphragm unit 118 remains in expanded condition then the pilot valve member will remain held open.

Figures 3, 6:
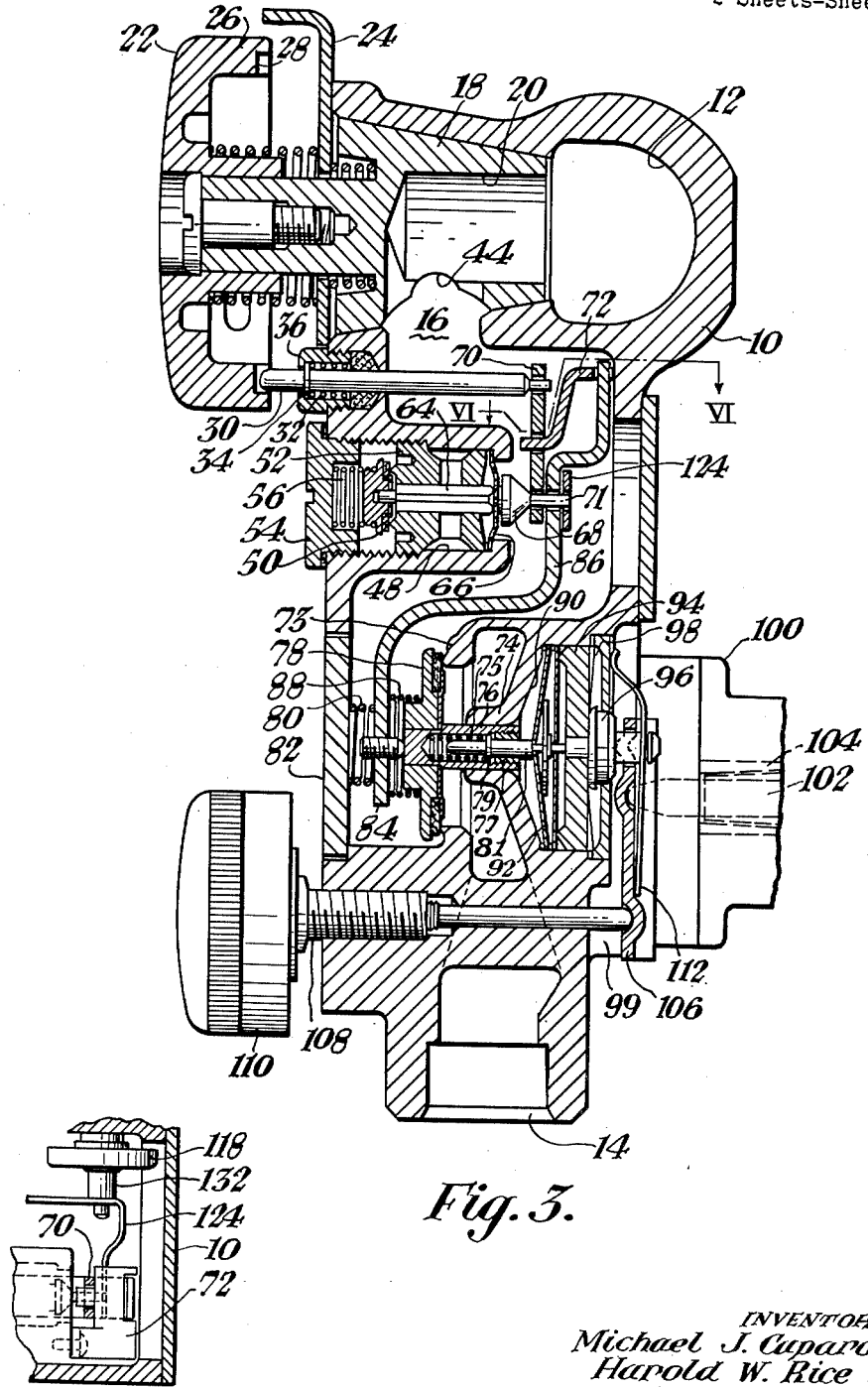
Fig. 3 is a longitudinal sectional view taken on the line III—III of Fig. 1, but shown on an enlarged scale.
Fig. 6 is a partial section taken on the line VI—VI of Fig. 3.

The knob 22 may now be released causing movement of the plunger 30 to the left, as viewed in Fig. 3, while the pilot valve lever 70 remains in its pivoted position due to the overlying relationship of the lever 86 therewith. It may be assumed that the rod element 102 of the rod-and-tube thermal device 102, 104 is in an advanced position within the recess 99 as the water in the tank is still cold and the tube element 104 is contracted. Consequently, the end of the connecting lever 106 in engagement with the thrust button 96 is moved by the rod element 102 in a counterclockwise direction, as viewed in Fig. 3, and about the end of the adjusting screw 108 as a fulcrum. Such movement of the thrust button 96 causes the clicker mechanism 92, 94 to snap over and actuate the valve member 78 to open position. The device is thus in normal running condition depending on the temperature set by the temperature adjusting knob 110.

As the water in the tank increases in temperature, the rod element 102 will be retracted away from the casing 10 and the force exerted by the lever 106 on the thrust button 96 will cease. Thus, the valve member 78 will move toward closed position relative to the valve seat 73 to shut off flow of fuel through the outlet 14 to the main burner. Such operation of the valve member 78 between open and closed positions will continue as necessary to maintain the temperature set by the temperature adjusting knob 110.

Should the flame at the pilot burner become extinguished then the bulb element 114 will become cooled allowing the diaphragm unit 118 to contract. The resulting clockwise movement (Fig. 4) of the angular lever 124 removes the holding force upon the operating lever 86. The main valve spring 80 is thereupon free to exert its bias upon the operating lever 86 which rotates in a counterclockwise direction, as viewed in Fig. 3, causing the main valve member 78 to move to closed position and shut off flow of fuel through the main outlet 14. Simultaneously, the pilot valve member 50 moves to closed position under bias of the pilot valve spring 56 now that the thrust exerted by the intermediate portion of the operating lever 86 is removed from the operating head 68.

The main valve member 78 will remain closed despite cooling of the water in the tank and resulting movement of the rod element 102 to the left as viewed in Fig. 3. Thus, should such movement of the rod element 102 occur under such conditions, then the clicker mechanism 92, 94 will snap over without any damage occurring due to the operation of the override mechanism. The spring 75 becomes compressed by operation of the plunger 81 associated with the clicker mechanism during such operation.

It will be apparent that a control device without interlock between the main gas cock 18 and the pilot valve 50 has been provided without sacrifice of safe lighting. Moreover, should the automatic pilot control fail during normal running conditions by virtue of a leak or other failure occurring in the vapor pressure device, then the diaphragm unit 118 can no longer expand and the valve member 78 and the pilot valve member 50 will immediately close. The operation under such conditions is thus similar to that which occurs upon extinguishment of the pilot burner and produces a safe-failure of the control device.

It will be understood that many changes may be made in the details of construction and arrangement of parts without departing from the scope of this invention as defined in the appended claims.

We claim:

1. A fluid control mechanism comprising a casing having main and pilot passages for fluid therethrough, main valve means for controlling said main passage, pilot valve means for controlling said pilot passage, said main and pilot valve means being biased to closed position, manually operable means including a pilot valve lever for overcoming the bias of said pilot valve means and opening said pilot valve means, a first expansible and contractable device for overcoming the bias of said main valve means and opening said main valve means, an operating lever having one operating portion movable into active position for holding said main valve means closed in opposition to said first device, said operating lever having another operating portion movable into active position for holding said pilot valve means open, and a second expansible and contractable device operable for moving said one operating portion of said operating lever out of said active position and moving said other operating portion thereof into said active position.

2. A fluid control mechanism comprising a casing having main and pilot passages for fluid therethrough, main valve means for controlling said main passage, pilot valve means for controlling said pilot passage, said main and pilot valve means being biased to closed position, a pilot valve lever pivoted intermediate the ends thereof in said casing and having a free end operatively engageable with said pilot valve means, manually operable means engageable with the opposite end of said pilot valve lever for opening said pilot valve means, a first expansible and contractable device for overcoming the bias of said main valve means, an operating lever pivoted at one end in said casing and having a free end movable into active position for holding said main valve means closed in opposition to said first device, said operating lever having an intermediate portion movable into active position relative to said pilot valve lever for holding said pilot valve means open, a connecting lever pivoted in said casing and being operatively engageable with said intermediate portion of said operating lever, and a second expansible and contractable device operatively engageable with said connecting lever for moving said free end of said operating lever out of said active position and moving said intermediate portion thereof into said active position.

3. A fluid control mechanism comprising a pair of valve means movable between closed and open positions on substantially parallel axis and being biased to said closed position, manually operable means for overcoming the bias of one of said valve means, a first expansible and contractable device for overcoming the bias of the other said valve means, lever means extending between said pair of valve means having one operating portion movable into active position for holding said other valve means closed in opposition to said first device, said lever means having another operating portion movable into active position for holding said one valve means open, a second expansible and contractable device operable on an axis transverse to said valve means, and an angular lever operatively engageable by said second device for moving said one operating portion out of said active position and moving said other operating portion thereof into said active position.

4. A fluid control mechanism comprising a pair of valve means movable between closed and open positions on substantially parallel axis and being biased to said closed position, manually operable means for overcoming the bias of one of said valve means, a first expansible and contractable device operable on one side of said other valve means for overcoming the bias thereof, lever means extending between said pair of valve means having one operating portion movable into active position on the opposite side of said other valve means for holding the same closed in opposition to said first device, said lever means having another operating portion movable into active position for holding said one valve means open, a second expansible and contractable device operable on an axis transverse to said valve means, and an angular connecting lever operatively engageable by said second device for moving said one operating portion out of said active position and moving said other operating portion thereof into said active position.

5. A fluid control mechanism comprising a casing having main and pilot passages for fluid therethrough, main valve means for controlling said main passage, pilot valve means movable on an axis substantially parallel with said main valve means for controlling said pilot passage, said main and pilot valve means being biased to closed position, manually operable means for overcoming the bias of said pilot valve means, a first expansible and contractable device operable on one side of said main valve means for overcoming the bias thereof in the contracted condition of said device, lever means extending between said main and pilot valve means having one operating portion movable into active position on the opposite side of said main valve means for holding the same closed in opposition to said first device, said lever having another operating portion movable into active position for holding said pilot valve means open, a second expansible and contractable device operable on an axis transverse to said main and pilot valve means, and an angular connecting lever operatively engageable by said second device in the expanded condition thereof for moving said one operative portion out of said active position and moving said other operating portion thereof into said active position.

6. A fluid control mechanism comprising a casing having main and pilot passages for fluid therethrough, main valve means for controlling said main passage, pilot valve means movable on an axis substantially parallel with said main valve means for controlling said pilot passage, said main and pilot valves being biased to closed position, a pilot valve lever pivoted intermediate the ends thereof in said casing and having a free end operatively engageable with said pilot valve means, manually operable means engageable with the opposite end of said pilot valve lever for opening said pilot valve means, a first expansible and contractable device operable on one side of said main valve means for overcoming the bias of said main valve means in the contracted condition of said device, an operating lever pivoted at one end in said casing and having a free end movable into active position on the opposite side of said main valve means for holding said main valve means closed in opposition to said first device, said operating lever having an intermediate portion movable into active position relative to said pilot valve lever for holding said pilot valve means open, a second expansible and contractable device operable on an axis transverse to said main and pilot valve means, and an angular connecting lever operatively engageable by said second device in the expanded condition thereof for moving said free end of said operating lever out of said active position and moving said intermediate portion thereof into said active position.

7. A fluid control mechanism comprising a casing having main and auxiliary passages for fluid therethrough, main valve means for controlling said main passage, auxiliary valve means for controlling said auxiliary passage, said main and auxiliary valve means being biased to closed position, a first expansible and contractable device for overcoming the bias of said main valve means and opening said main valve means, an operating lever having one operating portion movable into active position for holding said main valve means closed in opposition to said first device, said operating lever having another operating portion movable into active position for holding said auxiliary valve means open, an expansible fluid-containing thermostatic device operable when heated for exerting a force on said operating lever for moving said one operating portion of said operating lever out of said active position and moving said other operating portion thereof into said active position, and manually operable means for moving said auxiliary valve means against said bias to said open position independently of said operating lever.

References Cited in the file of this patent

UNITED STATES PATENTS

| | | |
|---|---|---|
| 2,085,300 | Dillman | June 29, 1937 |
| 2,163,801 | Newell | June 27, 1939 |
| 2,319,685 | Jackson | May 18, 1943 |
| 2,327,582 | Dougherty | Aug. 24, 1943 |
| 2,376,525 | Taylor | May 22, 1945 |
| 2,443,581 | Lange | June 15, 1948 |
| 2,457,378 | Johnson | Dec. 28, 1948 |
| 2,607,529 | Garner | Aug. 19, 1952 |